United States Patent [19]
Arel

[11] 3,848,490
[45] Nov. 19, 1974

[54] METHOD AND APPARATUS FOR CONTROLLING A CUTTING TOOL

[75] Inventor: Roger R. Arel, New Britain, Conn.

[73] Assignee: Gerber Garment Technology, Inc., East Hartford, Conn.

[22] Filed: Nov. 2, 1973

[21] Appl. No.: 412,149

[52] U.S. Cl............................. 83/49, 83/71, 83/360, 83/368, 83/747, 83/756, 83/925 CC
[51] Int. Cl............................................... D06h 7/00
[58] Field of Search......... 83/49, 56, 360, 368, 747, 83/756, 757, 925 CC, 71

[56] References Cited
UNITED STATES PATENTS
3,780,607   12/1973   Gerber....................... 83/925 CC X Primary Examiner—J. M. Meister
Attorney, Agent, or Firm—McCormick, Paulding & Huber

[57] ABSTRACT

Method and apparatus for controlling a cutting blade which cuts pattern pieces from layups of sheet material held in a compressed condition by vacuum employs a pressure sensor to detect previous cuts near the blade as the blade advances along a cutting path through the layup. The sensor has a pickup which translates with the blade along the cutting path and the reduced pressure produced by the vacuum in the previous cuts is sensed as the blade comes into close proximity to the cuts. When a cut is detected, control mechanism regulating the motions of the blade through the layup respond to the detected cut and vary the cutting parameters of the blade to permit more accurate cutting in regions adjacent the cut.

25 Claims, 6 Drawing Figures

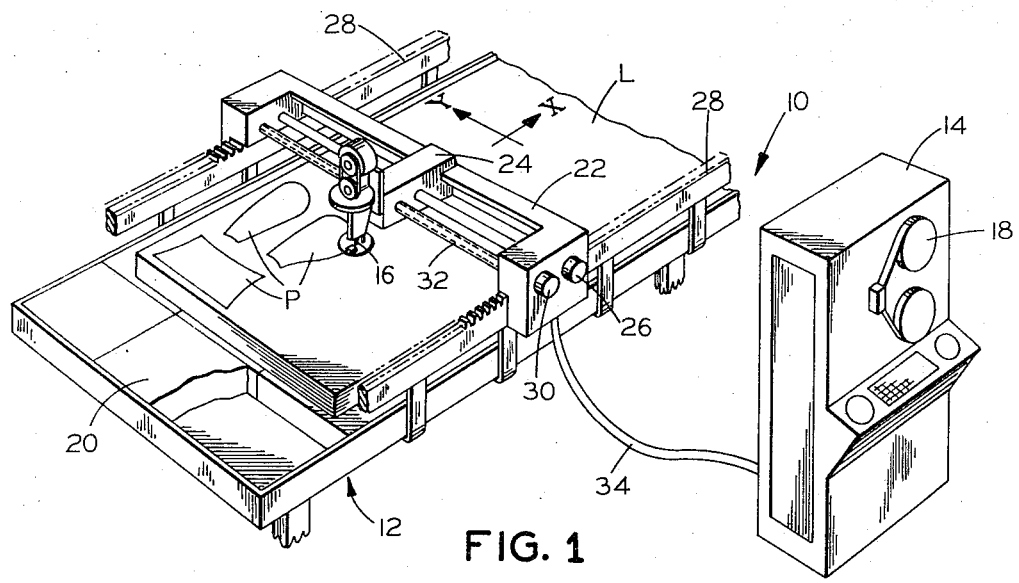
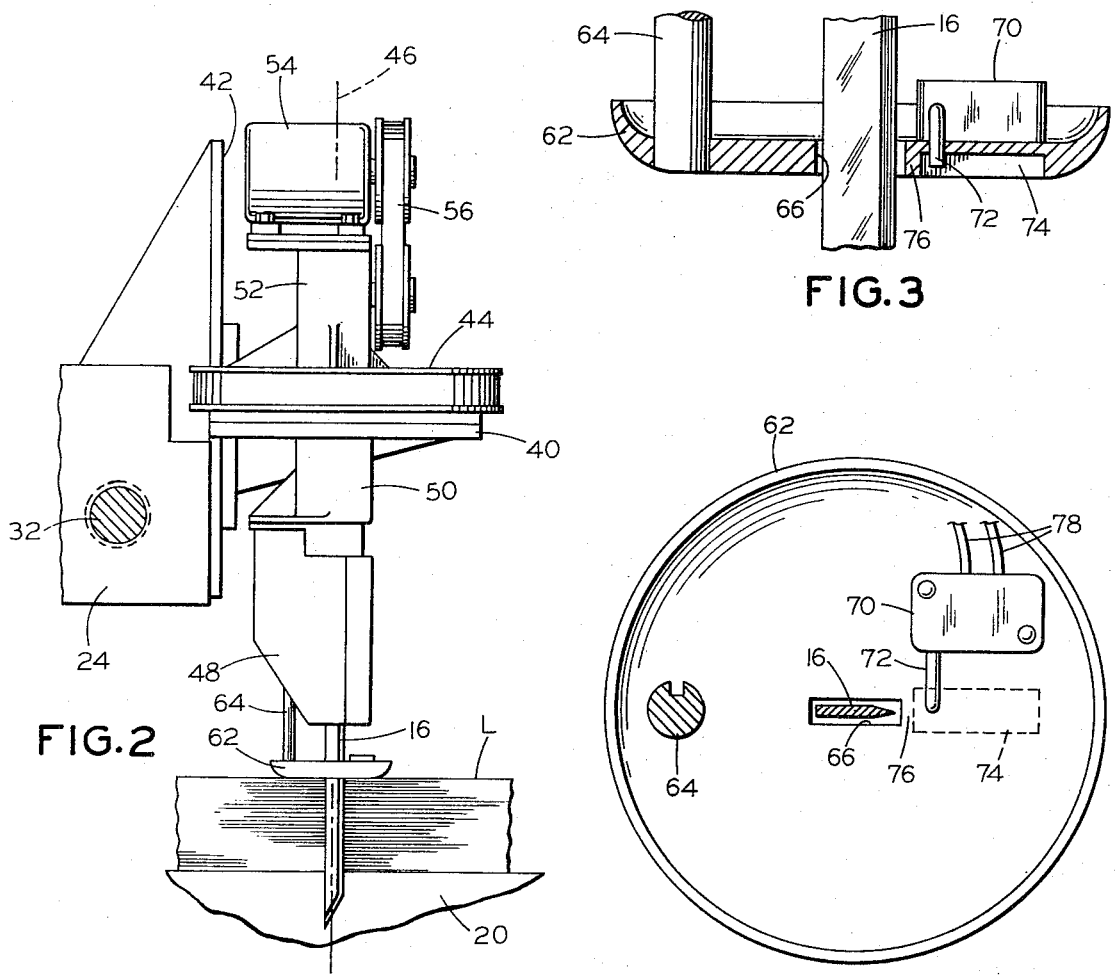

METHOD AND APPARATUS FOR CONTROLLING A CUTTING TOOL

BACKGROUND OF THE INVENTION

The present invention relates to a method and apparatus for controlling cutting parameters as a cutting blade is translated along a cutting path through fabric, paper, plastic and other limp sheet materials.

The use of numerically controlled cutting machines for cutting pattern pieces from limp sheet material is well known in the art. It has been learned by experience that optimum utilization of the sheet material and minimum difficulty in cutting cannot be achieved by indiscriminately translating a cutting blade along the cutting path under numerical control. It has been learned that cutting parameters, such as the speed of the cutting operation (including both feed rate along the cutting path and the stroking or spin rate of a blade), have significant effects upon the ability of a cutting tool to execute cuts in close proximity to previous cuts. The difficulty of operating cutting blades in regions of the sheet material through which the blade has previously passed stem from the fact that the material has lost some of its own supporting strength and, therefore, it may recede from an approaching cutting blade or push the blade itself out of the intended cutting path and into an adjacent slit or cut previously made by the same or another cutting blade.

Solutions to the difficult problems of translating a cutting blade through regions of the sheet material in the vicinity of previous cuts have been established and depend upon varying or changing the cutting parameters in the sensitive regions. For example, U.S. Pat. application No. 314,144, filed Dec. 11, 1972, now U.S. Pat. No. 3,803,960 and entitled SYSTEM AND METHOD FOR CUTTING PATTERN PIECES FROM SHEET MATERIAL, having the same Assignee as the present invention, reveals that the cutting operation in sensitive regions adjacent previous cuts can be executed by reducing the feed rate of a cutting blade and by turning the blade slightly away from the previous cut when the blade passes in close proximity to it. It is also desirable to reduce the stroking rate of a reciprocating blade at the same time as the feed rate to prevent heat generation and fusing of the sheet material being cut. The point of closest approach to an adjacent cut can also be reached by advancing the blade in one direction along the cutting path, stopping the blade at the point and then approaching the point along the path from the opposite direction.

Varying the cutting parameters as described above can be performed by pre-programming the desired changes and incorporating them in the overall cutting program which guides the blade along desired lines of cut. However, it is also desirable to employ the same techniques when they are needed but without preestablishing their occurrence in the basic cutting program defining the lines of cut.

Accordingly, it is a general object of the present invention to disclose a method and apparatus by which previous cuts in the vicinity of a cutting blade are sensed in the course of a cutting operation to vary the cutting parameters and to improve the accuracy of a desired cut.

SUMMARY OF THE INVENTION

The present invention resides in a method and apparatus for controlling a cutting blade which operates upon sheet material held in place by a vacuum system during the cutting operation. Means are provided for sensing previous cuts in the region of the cutting tool as the tool advances along the cutting path through the sheet material. In the preferred form, the sensing means comprises a pressure sensor which cooperates with the vacuum system in detecting the previous cuts by sensing the reduced pressure produced by the vacuum system at the surface of the sheet material where a cut exists. The sensor is provided with a pickup which travels with the advancing cutting blade immediately adjacent the blade to detect previous cuts as they are approached. Means responsive to the sensor vary the cutting parameters such as the feed rate or angular relationship of the blade relative to the cutting path and the previous cut to facilitate cutting in the sensitive area adjacent the previous cut. The results achieved by selectively varying the cutting parameters are cuts more accurately corresponding to the cuts defined in the cutting program.

BRIEF DESCRIPTION OF THE DRAWINGS

FIG. 1 is a perspective view of an automatically controlled cutting apparatus employing the present invention.

FIG. 2 is a fragmentary cross-sectional view of the cutting tool and carriages for translating the tool through a layup of sheet material in the apparatus shown in FIG. 1.

FIG. 3 is a fragmentary cross-sectional view of the presser foot and pressure sensor in the cutting apparatus in FIG. 1.

FIG. 4 is a plan view of the presser foot and pressure sensor in FIG. 3.

DESCRIPTION OF THE PREFERRED EMBODIMENTS

Figure 5:
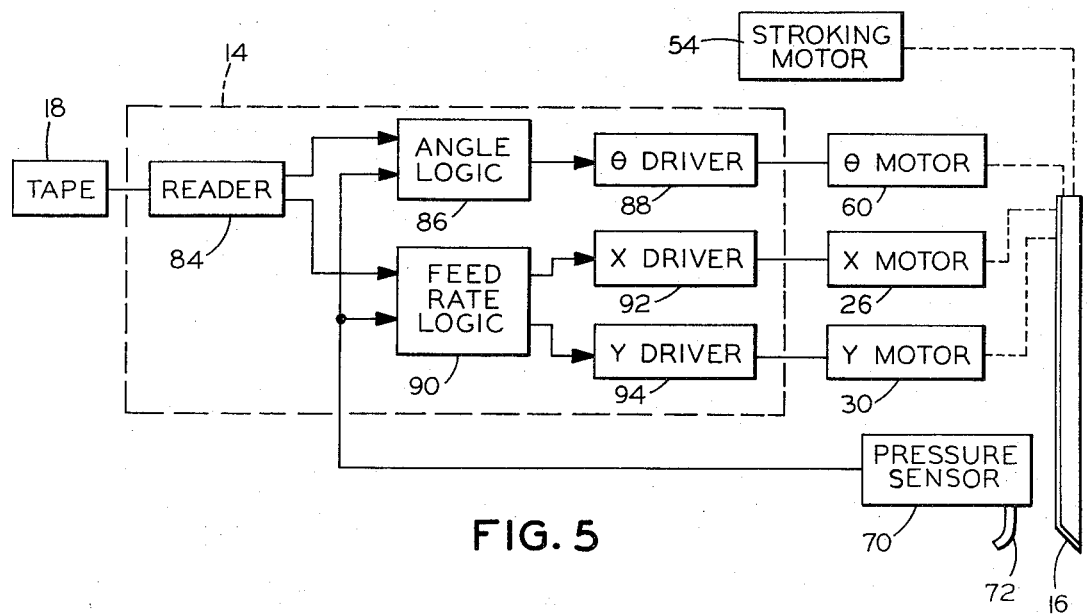
FIG. 5 is a block diagram illustrating the control system for controlling the cutting parameters or motions of a cutting blade in accordance with the present invention.

FIG. 1 discloses an automatically controlled cutting system, generally designated 10, in which the present invention is employed. The control system 10 includes a cutting table 12 and a controller 14 from which command signals emanate and pass to the table to cause a reciprocating cutting blade 16 on the table to move through a layup L of sheet material spread upon the support surface of the table 12 during the cutting operation. The commands from the controller 14 are derived from a program tape 18 and cause the blade 16 to translate along a cutting path defined by the periphery of pattern pieces to be formed. Several such pattern pieces P are shown on the surface of the layup.

The table 12 has a support bed 20 defining a support surface on which the sheet material is spread prior to a cutting operation. The bed 20 is preferably a penetrable bed formed by foamed plastic blocks or bristled mats so that the reciprocating cutting blade 16 can pass entirely through the layup and into the bed to completely sever the pattern pieces from the surrounding material as the blade translates along the cutting path.

To hold the sheet material in place, the bed 20 is a vacuum bed such as shown and described in greater detail in U.S. Pat. No. 3,495,492, having the same Assignee as the present invention. A reduced pressure or soft vacuum is produced within the layup L by drawing air from the layup through the support surface of the bed 20 and into a vacuum system within the table. Of course, other vacuum systems not forming an integral part of the table can also be used. As described in the above-referenced patent it is sometimes desirable to position a non-permeable overlay, such as a sheet of polyethylene, on the top of the layup to improve the hold-down characteristics and to compress the sheet material of the layup. The holding and compressing forces generated by the vacuum within the layup of sheet material tend to normalize the material, that is, the forces cause different materials to react in similar fashion to the cutting blade and hence permit cutting operations on different materials to be carried out with essentially the same programs.

The vacuum system in the table 12 must be sized to generate an adequate differential pressure across the layup during a cutting operation and differential pressures of at least 2–3 psi are preferred. It will be understood also that the differential pressure across the layup is reduced in the vicinity of a cut produced by the blade 16 due to the leakage of air through the cut into the table. The vacuum system, nevertheless, must be of sufficient capacity of maintain the minimum pressure differential in the vicinity of the blade so that the positioning and compression of the sheet material in the layup does not change even after large regions of the layup have been cut by the blade 16 in accordance with the cutting program. The maintenance of adequate pressure differentials can be aided by establishing several zones throughout the penetrable bed 20 of the table and by evacuating only the zone or zones in which the cutting blade 16 is moving at any given period of time. U.S. Pat. No. 3,495,492 referenced above illustrates and describes such a zoning system and reference may be had to the patent for a more detailed explanation of its operation.

The cutting blade 16 is suspended above the penetrable bed 20 by an X-carriage 22 which traverses the bed 20 in the illustrated X-coordinate direction and a Y-carriage 24 mounted on the X-carriage and traversing the bed in the illustrated Y-coordinate direction. An X-drive motor 26 rotates two pinions (not shown) at opposite lateral sides of the table 12 and the pinions respectively engage the gear racks 28 extending longitudinally along the lateral sides of the table to control the blade motions in the X-direction. A Y-drive motor 30 rotates a lead screw 32 which is threadably engaged with the Y-carriage 24 to cause the carriage to be translated in the Y-coordinate direction relative to the X-carriage 22 and the layup L. Both the X-drive motor 26 and the Y-drive motor 30 receive displacement commands from the controller 14 through a cable 34 in accordance with the cutting program defined on the tape 18.

FIG. 2 illustrates in greater detail the cutting head including the cutting blade 16 and its suspension from the Y-carriage 24. A bracket 40 is mounted in cantilever fashion from the projecting end of the Y-carriage 24 on a set of vertical rails or guide ways 42 to permit the bracket 40 and the blade 16 to be lowered and elevated in and out of cutting engagement with the layup L on the penetrable bed 20 of the table 12. A motor (not shown) is utilized to raise and lower the bracket 40. A platform 44 is mounted on the bracket 40 to rotate relative to the bracket and the remainder of the cutting table 12 about a $\theta$-axis 46 perpendicular to the support surface of the penetrable bed 20. Rotation of the platform 44 about the axis 46 is also controlled by a $\theta$-drive motor 60 (illustrated schematically in FIG. 5) which receives rotation commands from the controller 14 in response to the cutting program 18. The cutting blade 16 is suspended from the rotatable platform 44 by means of a blade guide 48 and a depending pedestal 50 and is centered on the $\theta$-axis 46. At the upper side of the platform 44 are another pedestal 52 and a reciprocation drive motor 54 mounted on the pedestal 52. The motor 54 is connected in driving relationship to the blade 16 by means of a belt-pulley drive 56 and a reciprocating drive linkage (not shown) within the pedestals 50 and 52.

It will be understood from the suspension arrangement described above that the cutting blade 16 can be plunged through the layup of sheet material at any point and then translated along the contours of pattern pieces in accordance with cutting parameters, such as feed rate, stroke rate and blade angle, defined on the program tape 18. The cutting blade is maintained in a generally tangent relationship to the cutting path defined by the pattern piece contours at each point along the path by rotating the blade about the $\theta$-axis 46. The drive motor 54 may be a variable speed drive motor so that the stroking rate of the blade 16 can be varied. Although a variable stroking rate is not essential, it is desirable and is used to reduce the reciprocation rate of the cutting blade when the feed rate is reduced to thereby prevent fusing of the material due to heat generated by the reciprocating blade.

A presser foot 62 shown in greater detail in FIGS. 3 and 4 is suspended from the blade guide 48 by a support rod 64 so that the bottom or pressing surface of the foot 62 rests on the upper ply of the layup L. The presser foot 62 surrounds the cutting blade 16 and has a central aperture 66 accommodating the blade. An auxiliary blade guide may be mounted in the aperture. A support rod 64 for the foot 62 has a keyway which is engaged by a key within the blade guide 48 to hold the presser foot aligned with the blade as it is translated and rotated during a cutting operation. The support rod 64 may be mounted to slide freely into and out of the blade guide 48 so that the presser foot 62 will rest under its own weight on the layup. A limit stop (not shown) connected to the rod prevents the foot from falling out of the blade guide when the entire cutting head including the blade 16 and rotatable platform 44 are lifted away from the sheet material.

In accordance with the present invention, a sensor 70 in the form of a pressure or vacuum switch is mounted in the presser foot 62 and is connected by means of a pressure pickup tubing 72 to a sensing chamber 74 in the lower portion of the foot. The pressure sensor 7o is utilized to detect the reduced pressure produced by the vacuum system adjacent the upper ply of the layup at previous cuts made by the cutting blade in the course of its cutting operation. It is desirable to detect previous cuts in close proximity to the cutting blade because the material in such regions is not fully supported and may either shift away from the knife toward the cut or may force the blade to jump suddenly out of the desired path of cut into the previous cut.

The chamber 74 is closed except for the tubing 72 and the aperture in the pressing surface of the presser foot 62 which exposes of the chamber to the local pressure existing under the chamber at the upper ply of the layup L. The chamber 74 is located in the presser foot at a station in advance of the cutting blade 16 but is separated from the cutting blade aperture 66 by an isolation wall 76 so that low pressures created by the vacuum system around the cutting blade as the blade penetrates through the evacuated layup into the bed 20 are not detected in the chamber. The sensing chamber 74 is elongated in the direction in which the cutting blade travels to provide lead time for the automatic control system to respond to a sensed cut and to ensure that all cuts which appear in front of the blade are sensed. As soon as the chamber 74 moves over a previous cut and the reduced pressure in the cut evacuates the chamber and the pickup tubing 72, the switch 70 closes and provides a signal through the leads 78.

As shown in FIG. 5, the output of the pressure sensor 70 is connected to the controller 14. The signal derived from the switch 70 when a previous cut is detected is utilized to change the cutting parameters or motions of the cutting blade through the layup so that the blade will continue along the desired cutting path and the pattern pieces will be accurately cut. The changing of the cutting parameters may include yawing the cutting blade away from the previous cut, slowing the cutting operation down or a combination of the two.

The cutting operation is slowed down by reducing the feed rate of the blade relative to the sheet material, reducing the stroking rate of the blade or both.

Yawing of the cutting blade refers to the process of rotating or turning the blade slightly about the $\theta$-axis 46 relative to the tangential position on the cutting path. The direction in which the blade yaws is selected to turn the leading, cutting edge of the blade away from the previous cut.

Figure 6:
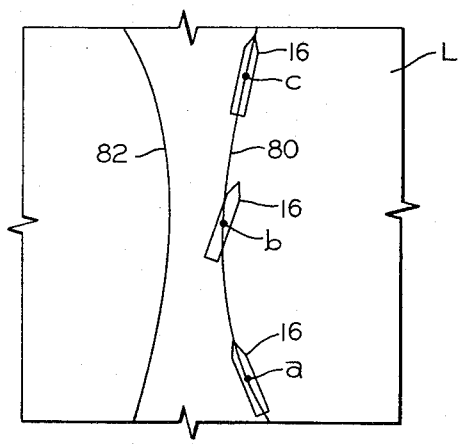
FIG. 6 is a fragmentary plan view of a sheet material layup showing schematically the positions of a cutting blade as it translates along the cutting path past a previously executed cut.

An exemplary yawing operation is illustrated in a fragmentary plan view of the layup in FIG. 6. The cutting blade 16 is illustrated schematically at three points $a$, $b$ and $c$, assumed successively as the blade advances along a cutting path 80 which passes in close proximity to a previous cut 82 in the sheet material. At point $a$ the cutting blade 16 is shown translating along the cutting path 80 in tangential relationship to the path. As the blade passes point $a$, it is rotated at a slight angle to the cutting path 80 with the leading edge of the blade turned away from the previous cut 82 as illustrated at position $b$. With the blade yawed, it advances from point $a$ into close proximity to the previous cut at point $b$ and tends to move away from the previous cut and to oppose the forces of the material which push the blade toward the previous cut. Once the blade has passed through the critical region adjacent the previous cut to point $c$, the angular rotation or bias applied to the blade is removed and the tangential position of the blade in alignment with the cutting path is reestablished as illustrated.

The reduction in the feed and stroking rates may also be made during the movement of the blade between points $a$ and $c$ or may be made without an accompanying yawing operation.

It will be understood that to vary the cutting parameters in the prior art system, it is necessary to preprogram the corrective values after determining those points along the cutting path which are critical to the cutting operation. With the present invention, however, the pressure sensor 70 detects the previous cut and signals the controller 14 to apply corrective values in the critical area.

FIG. 5 illustrates one configuration of the controller which permits the cutting parameters of the blade to be modified in accordance with the signal received from the pressure sensor 70. Programmed command signals are taken from the tape 18 in conventional fashion by the tape reader 84 of the controller. Information defining the angular relationship of the cutting blade about the $\theta$-axis 46 passes to the angle logic circuitry 86 where a corresponding signal is produced to operate the $\theta$-drive amplifier 88 and the $\theta$-drive motor 60 which rotates the blade about the $\theta$-axis 46. When the angle logic circuitry 86 receives an electrical signal from the pressure sensor 70 indicating that a previous cut is in the vicinity of the cutting blade, it automatically adds a preestablished bias voltage or incremental $\theta$-rotation to the $\theta$-command derived from the tape 18 by the reader 84.

As the blade passes the previous cut, the signal from the pressure sensor is lost but a fixed delay circuit in the logic circuitry 86 holds the angular bias until the blade has advanced beyond the point of closest approach to the previous cut to, for example, the point $c$ illustrated in FIG. 6 where the tangential position is reestablished.

It should be understood that in this situation the cutting program is prepared to translate the cutting blade along the periphery of a pattern piece in a standard direction, that is either clockwise or counterclockwise about the piece, so that each time a previous cut is sensed it is known that the cut must lie to the left of the advancing cutting blade and, therefore, a right-bias or rotation must be applied to the $\theta$-command to turn the leading edge of the cutting blade 16 away from the previous cut. Of course, it is also feasible to employ separate pressure sensors to detect previous cuts at one side of the cutting path or the other and to bias the orientation of the cutting blade accordingly.

Another parameter that can be varied by the pressure sensor 70 is the feed rate of the blade which is normally controlled by information from the program tape 18. A feed rate logic circuitry 90 in the controller 14 receives the feed rate information derived from the tape 18 by the reader 84 and produces corresponding X- and Y-signals for the X-driver amplifier 92 and Y-driver amplifier 94 to operate the X- and Y-drive motors 26 and 30 respectively. The two drive motors 26 and 30 determine the rate at which the cutting blade 16 moves relative to the sheet material in the X-Y plane of the cutting table 12.

When a previous cut is detected by the pressure sensor 70, the electrical signal produced by the sensor is also supplied to the feed rate logic circuitry 90 and a fixed reduction in the feed rate is automatically commanded in both the X- and Y-drive channels by, for example, reducing the gains of the amplifiers.

In a similar manner, the stroking speed of the cutting blade may be reduced in response to the signal from the sensor 70 by reducing the speed of the stroking motor 54. Normally the motor 54 runs at a fixed speed and does not derive information from the program tape 18. Accordingly, the signal from the pressure sensor may simply be applied directly to the stroking motor without regard to a previously commanded stroking speed.

It should be understood that the changes in the blade parameters referred to above can be employed separately or in any desired combination to achieve improved cutting of the sheet material in the vicinity of previous cuts made by the cutting blade 16. The system illustrated in FIG. 5 indicates that bias signals are applied simultaneously to the control channels regulating the orientation and feed rate of the cutting blade. However, separate sensors and sensing chambers can be employed to change the individual parameters at different points along the path adjacent a previous cut. Separate sensors and chambers located at each side and slightly in advance of the blade may be used to reduce the feed rate and apply a $\theta$-bias, and another sensor directly in front of the advancing blade may be used to stop the blade entirely. Delay circuits in the controller can be used to change the feed rate and $\theta$-rotation at different times in response to a signal from a single pressure sensor.

In summary, the present invention employs a pressure sensor 70 which cooperates with the vacuum system of the cutting table 12 to detect previous cuts made by the blade 16 when the blade approaches in close proximity to the cuts. Appropriate adjustments in the cutting parameters of the blade are made to improve the cutting operation in the sensitive areas adjacent previous cuts. Conventional cutting programs, that is programs not previously prepared with modified cutting parameters in the sensitive areas, may be used in a routine manner with the apparatus which automatically interrupts or changes the cutting programs in those instances where cuts are sensed. It is not necessary to establish where the sensitive areas lie prior to a cutting operation since the sensor 70 carried along the cutting path with the blade provides that information as the sensitive areas are approached.

While the present invention has been described in a preferred embodiment, it will be understood that further substitutions and modifications can be had without departing from the spirit of the invention. It has already been mentioned that more than one sensor may be utilized in the vicinity of the cutting blade to determine more precisely the exact location of a previous cut with respect to the advancing blade. The precise configuration of the sensing chamber 34 need not be as illustrated and it will be understood that by varying the configuration of the chamber in the pressing surface of the foot 62, the region over which the system is sensitive is correspondingly varied. The region can also be varied by adjusting the sensitivity of the sensor. Cutting parameters other than those specifically described above can also be varied by means of the sensor 70. Accordingly, the present invention has been described in a preferred embodiment by way of illustration rather than limitation.

I claim:

1. In combination in an automatically controlled cutting machine having a cutting table with a cutting tool and a support surface on which sheet material to be cut is spread and held by means of a vacuum holddown system, the table also including means for moving the cutting tool and the sheet material on the surface relative to one another along a line of cut with the tool advancing in cutting engagement with the material, the improvement comprising:

means for sensing previous cuts by the tool in the sheet material in the region of the cutting tool as the tool advances through the sheet material.

2. The improvement of claim 1 wherein the sensing means comprises a pressure sensor for detecting the reduced pressure produced by the vacuum system in a previous cut.

3. The improvement of claim 1 wherein the sensing means comprises a pressure sensor having a pressure pickup located adjacent and traveling with the cutting tool as the tool advances through the sheet material along the line of cut.

4. The improvement of claim 3 wherein:
a presser foot is connected to the means for moving and surrounds the cutting tool for holding the sheet material during a cutting operation; and
the pickup of the pressure sensor is carried by the presser foot.

5. The improvement of claim 4 wherein:
the presser foot has a pressing surface making contact with the sheet material during a cutting operation and a sensing chamber is defined in the foot and exposed at the pressing surface; and
the pressure sensor pickup is connected with the sensing chamber in the presser foot.

6. The improvement of claim 4 wherein the pressure sensor is a pressure switch mounted in the presser foot.

7. The improvement of claim 1 wherein:
the means for sensing comprises a sensor having a pickup mounted adjacent the cutting tool and responsive to leakage caused by the vacuum holddown system through the previous cut in the sheet material.

8. The improvement of claim 7 wherein:
the pickup is mounted immediately in advance of the cutting tool.

9. Apparatus for controlling the cutting blade of an automatically controlled cutting machine having a support table on which a layup of sheet material is held compressed by a vacuum system, means for translating the cutting blade and the layup relative to one another at variable feed rates and means for rotating the cutting blade in the sheet material to establish tangency of the blade and the cutting path through the sheet material comprising:
means for sensing previous cuts in the material in close proximity to the cutting path as the cutting blade translates along the cutting path; and
means responsive to the sensing means for varying the motion of the cutting blade in the material as the blade translates into close proximity to the previous cut.

10. Apparatus for controlling the cutting blade as defined in claim 9 wherein:
the sensing means comprises a pressure sensor coupled with the cutting blade for translation with the blade along the cutting path adjacent the surface of the layup to detect the reduced pressure created by the vacuum system in the previous cut.

11. Apparatus for controlling as defined in claim 9 wherein the pressure sensor is a pressure switch.

12. Apparatus for controlling the cutting blade as defined in claim 10 wherein:
the means for varying comprises means for reducing the feed rate of the cutting blade through the sheet material.

13. Apparatus for controlling the cutting blade as defined in claim 10 wherein:
the means for varying comprises means for yawing the cutting blade relative to the cutting path and away from the previous cut.

14. Apparatus for controlling the blade as defined in claim 10 wherein:
the cutting blade is a reciprocating blade; and
the means for varying comprises means for reducing the stroking rate of the blade.

15. A method of controlling a cutting blade as the blade is guided along a cutting path through a layup of sheet material held in a compressed condition by means of vacuum generated within the layup comprising the steps of:
sensing a previous cut in the sheet material in the vicinity of the blade as the blade advances along the cutting path; and
changing a cutting parameter of the blade when a previous cut is sensed and as the blade passes the previous cut to modify the cutting operation in the vicinity of the previous cut.

16. The method of controlling a cutting blade as defined in claim 15 wherein the step of sensing comprises:

sensing the vacuum holding the sheet material in a compressed condition at the previous cut.

17. The method of claim 16 wherein the step of sensing further comprises sensing the effects of the vacuum at the surface of the layup.

18. The method of claim 17 wherein the step of sensing still further comprises sensing the reduced pressure caused by the vacuum in the previous cut at the surface of the layup.

19. A method of controlling a cutting blade as defined in claim 15 wherein the step of changing comprises slowing the cutting operation.

20. A method of controlling as defined in claim 19 wherein the step of slowing comprises reducing the feed rate of the cutting blade.

21. A method of controlling as defined in claim 20 wherein the step of reducing includes stopping the advancement of the cutting blade.

22. A method fo controlling as defined in claim 19 wherein the cutting blade is a reciprocating cutting blade and the step of slowing comprises reducing the stroking rate of the reciprocating cutting blade.

23. A method of controlling a cutting blade as defined in claim 15 wherein the step of changing comprises
rotating the cutting blade slightly about an axis perpendicular to the layup out of alignment with the cutting path to establish an angular relationship between the blade and the cutting path with the leading edge of the blade rotated away from the previous cut.

24. A method of controlling as defined in claim 23 further including the step of returning the cutting blade into alignment with the cutting path after the cutting blade passes the vicinity of the previous cut.

25. A method of controlling a cutting blade as defined in claim 15 including the additional step of reestablishing the changed cutting parameter to the condition prior to the change after the cutting blade passes the vicinity of the previous cut.

* * * * *